Jan. 6, 1931.  G. C. CARHART  1,787,720
MOTION TRANSMITTING MECHANISM
Filed April 28, 1924   3 Sheets-Sheet 1

George C. Carhart
Inventor
by Parsons & Bodell
Attorneys

Jan. 6, 1931.  G. C. CARHART  1,787,720
MOTION TRANSMITTING MECHANISM
Filed April 28, 1924  3 Sheets-Sheet 2

INVENTOR.
George C. Carhart.
BY
Parsons & Bordell
ATTORNEYS

Jan. 6, 1931.　　　G. C. CARHART　　　1,787,720

MOTION TRANSMITTING MECHANISM

Filed April 28, 1924　　　3 Sheets-Sheet 3

INVENTOR.
George C. Carhart,
BY Parsons & Birdell
ATTORNEYS.

Patented Jan. 6, 1931

1,787,720

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

MOTION-TRANSMITTING MECHANISM

Application filed April 28, 1924. Serial No. 709,534.

This invention relates to motion transmitting mechanism, and particularly to a mechanism for cushioning the torque between the driving and driven elements, or yieldingly transmitting the relative or differential rotation of one or either element to the other, which mechanism is particularly simple and economical in construction, and highly efficient and durable in use, and consists of but few compactly arranged parts.

The invention consists in the novel features and in the combinations and constructions hereinafter set forth and claimed.

In describing this invention reference is had to the accompanying drawings in which like characters designate corresponding parts in all the views.

Figure 1:
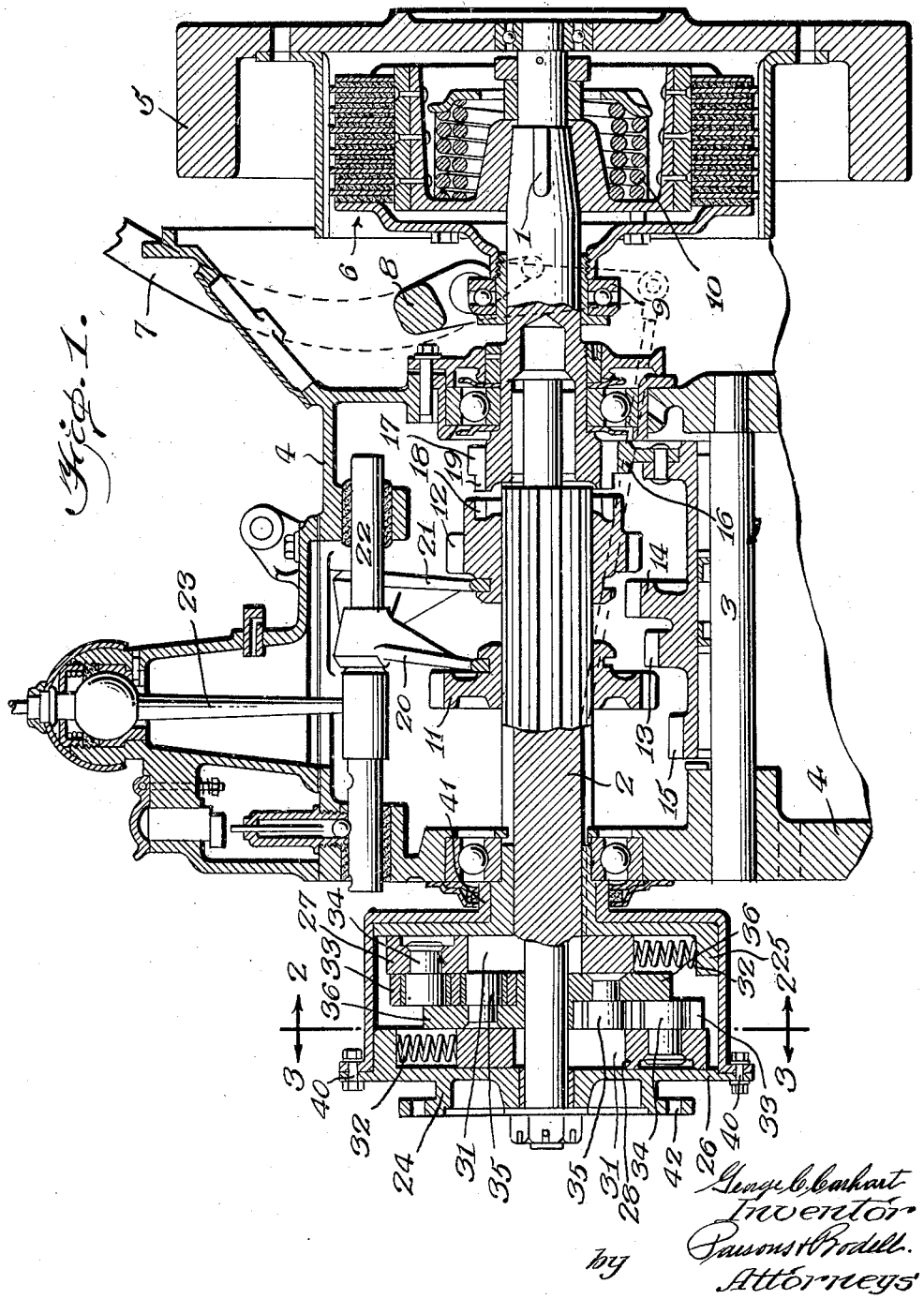

Figure 1 is a fragmentary sectional view of a transmitting mechanism embodying my invention.

Figure 2:
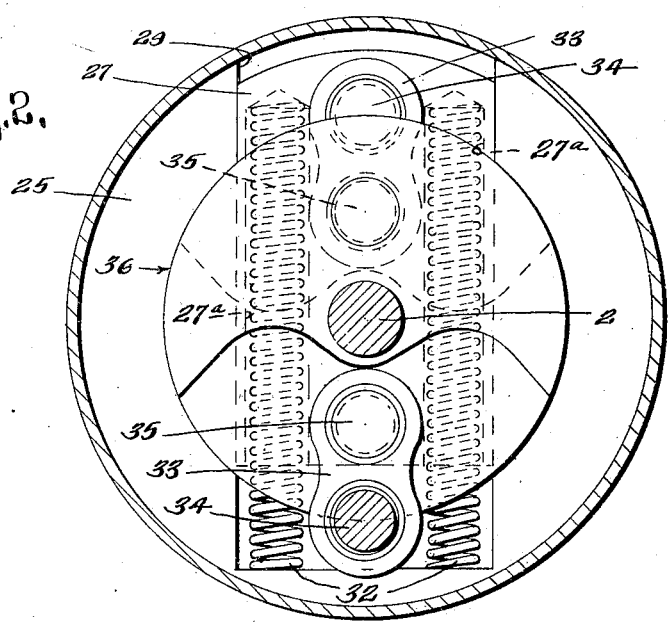
Figure 3:
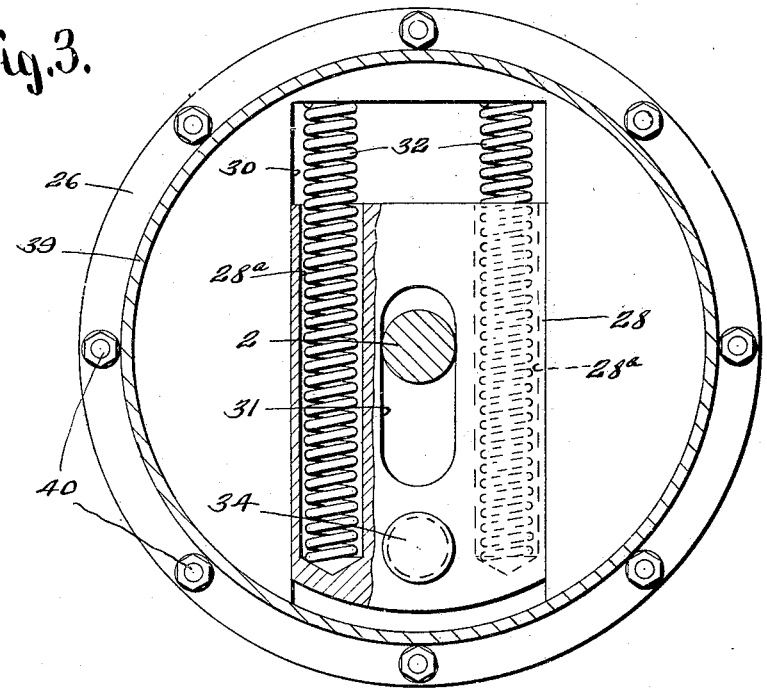

Figures 2 and 3 are sectional views taken, respectively, on lines 2—2, and 3—3, Fig. 1.

Figure 4:
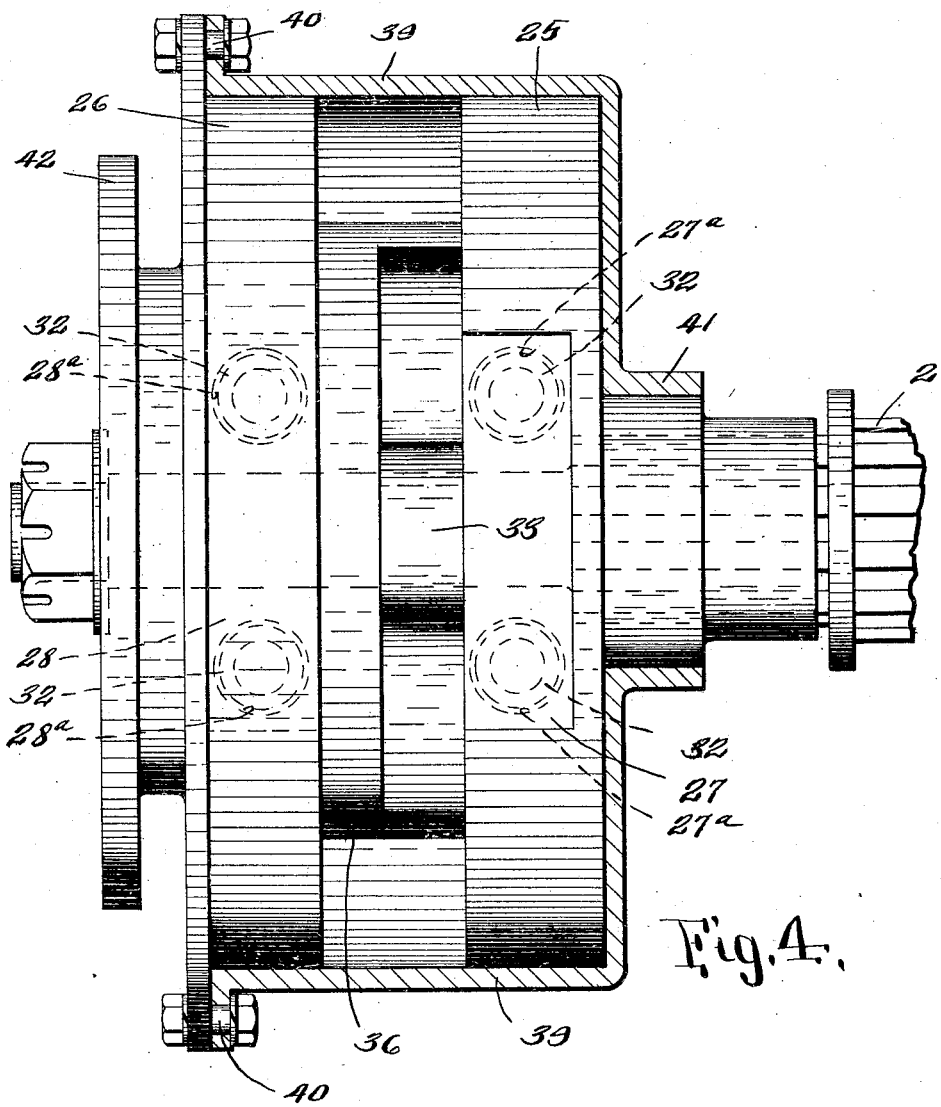

Figure 4 is an edge view or side elevation, the outer housing or casing being shown in section.

This transmitting mechanism is usable between any two driving and driven parts, subject to differential or relative movement, for example, it may be used in place of the differential gearing used in motor vehicles in which each axle shaft under certain well known conditions is a driving or driven element to the other shaft, or it may be used at any point between any two other driving and driven means, as at any point between the engine and the driving axle of motor vehicles or between the axles and the traction wheels, etc.

I have here illustrated my invention as embodied in the transmitting mechanism, between the speed changing gearing and the propeller shaft, where it acts to cushion the torque between the transmission shaft of the gearing and the propeller shaft, during the quick acceleration of the power, during the letting in of the main clutch after gear shifting or speed changing operations, and during letting in of the main clutch when the vehicle is running under its momentum or coasting, and the driven or propeller shaft acts as a driver to drive or crank the engine until the speed of the engine synchronizes with the speed of the vehicle.

This motion transmitting mechanism comprises generally, driving and driven elements, a member associated with one of said elements, and movable toward and from the axis of such element, means for resisting such movement of said member, and connecting means between said member and the other element, arranged to effect movement of said member upon relative rotation of the driving and driven elements. Preferably there are two of such members, one associated with the driving element, and the other with the driven element, and the connecting means connects said members, so that, the relative movement of either one is transmitted to the other member, said members moving during such relative movement and the driving and driven elements cushioning the torque or yieldingly transmitting the relative movement of one element to the other. In other words the connecting means between the member associated with one element (driving or driven) and the other element includes the member associated with the other element.

As before stated this mechanism is shown in the illustrated embodiment of my invention, as associated with a change speed transmission gearing. Such change speed gearing comprises generally a driving shaft 1, a driven shaft 2, and a counter shaft 3, suitably mounted in bearings in a case 4, the shafts 1 and 2, being arranged in axial alinement and one having a pilot bearing in the other, gears connecting the shafts, some of these gears being shiftable, and means for shifting the shiftable gears.

The driving shaft 1 is connected to the engine shaft or the flywheel 5 thereof, through the usual friction clutch 6, operable by a lever or clutch pedal 7, which acts through a yoke 8, on a throw-out collar 9, slidable on the shaft 1 outside of the casing 4. The clutch is held engaged by a powerful spring 10, and is operated against the action of the spring by the pedal 7 in the usual manner.

11 and 12 are the shiftable gears usually mounted on the driven shaft 2 to slide axially thereof into and out of mesh respectively with gears 13 and 14 on the counter shaft 3. The gear 11 being also shiftable into and out of mesh with an idler gear, not shown, meshing with a gear 15 on the counter shaft. The gears on the counter shaft are mounted to rotate as a unit, and are connected to the driving shaft 1 through intermeshing gears 16 and 17, mounted respectively on the counter shaft and on the inner end of the driving shaft 1. The gears 12 and 17 are provided with the usual clutch faces 18 and 19, which when engaged produce direct drive or high speed. The shiftable gears 11 and 12 are shifted by means of forks 20 and 21, mounted on suitable shifter rods as 22, slidable in suitable guides in the case, and operated by the usual selecting and shifting lever 23. Shifting of the gear 11 to the right, Fig. 1, into mesh with the gear 13 effects low speed; shifting of the gear 12 to the left into mesh with the gear 14 effects intermediate speed; shifting of the gear 12 to the right to engage the clutch faces 18, 19, effects high speed; and shifting of the gear 11 into mesh with an idler which meshes with the gear 15 effects reverse speed, all as will be understood by those skilled in the art.

The transmission shaft 2 is in the illustrated embodiment of my invention, the driving element of the torque cushioning mechanism, and the driven element 24 is shown as rotatably mounted on the outer or rear end of the shaft 2. The driving element or shaft 2 and the driven element 24 are formed or provided with opposing heads 25, 26, and either the driving or driven element, or both, are provided with a member movable toward and from the axis of said elements, and preferably both driving and driven elements are provided with such members, designated respectively 27, 28, these members being slides movable along or in guides or ways 29 and 30, which preferably extend radially and usually exactly radially relatively to the axis of the driving and driven elements, and the friction between the slide 27 or 28 and its guide 29 or 30, serves as means for resisting such sliding movement. Each slide 27 or 28 is here shown as formed with a lengthwise slot 31, which makes the slide bifurcated, so that it is arranged astride the shaft 2. Additional resisting means as springs 32 are arranged between the slides and the end of the guide in which the slide is movable. The springs for the slide 27 being preferably arranged diametrically opposite the springs for the slide 28. In order to provide for sufficient spring means each slide is formed with bores 27ᵃ or 28ᵃ in which the springs extend, these bores being located on opposing sides of the shafts.

The connection between each slide 27 or 28, and the other element or the slide thereof, is normally arranged to extend in the same general direction as the direction of movement of the slide, so that, they normally extend radially. This means comprises a link pivoted at one end to the slide, and pivotally connected at its other end to the other element, or in this embodiment of my invention, in which each element is formed with a slide, to the slide associated with the other element.

This connecting means for each slide 27 or 28, comprises a link 33 mounted at its outer end on a pivot or pin 34, carried by the slide 27 or 28, and pivoted at its inner end on a pin 35 carried by an intermediate part or disk 36 fulcrumed or rotatably mounted on the shaft 2. This intermediate part or disk 36 is formed with suitable cutouts or recesses to permit the movement of the links 33, and such disk abuts at its opposite faces against the heads 25, 26 and also against the slides where the disk spans the ways 29, 30, in which the slides 27 and 28 move. During the relative rotation of the driving and driven elements 2 and 24 one slide or the other will tend to move inwardly against the friction between it and its guide, and against the springs 32, and cause the link 33 to rock about its pivot 35 and in so doing cause the transmitting part or disk 36 to rock and thus rock the other link 33 and cause it to transmit sliding movement to the other slide.

The head 25 associated with the driving or transmission shaft 2 is usually keyed or splined to the shaft 2.

The driven element 24 as here shown includes a housing in the form of a drum 39, secured as by bolts 40 to the head 26 of the driven element 24, this housing encloses the head 25 and the mechanism between the heads 25 and 26, and has a hub 41 journalled on the hub of the head 25, and thrusting against the transmission case 4 or the bearing for the shaft 2, in such casing. The hub of the head 25 also thrusts against the bearing of the shaft 2. The head 26 is also formed on its rear side with a coupling 42 for connection to the propeller shaft of the vehicle or other part and for connection to the usual universal joint between the propeller shaft and the head 26.

In operation during quick acceleration of the engine or during the letting in of the main clutch after gear shifting or speed changing operations, or letting in of the main clutch when the vehicle is coasting, relative rotation of the driving and driven elements 2 and 24 takes place against the friction between the slides 27 and 28 and the guides therefor, and against the springs 32, thus relieving the transmission gear, the axle and all other parts from shocks and jars. Also when used as a differential gearing in the rear axle relative or differential movement of the driving and driven elements as the axle shafts is permitted, as when the vehicle is turning a corner.

Owing to the use of the slides or friction, comparatively little spring or spring action is necessary.

Owing to the assembly or arrangement of the heads and the connections between the heads of the slides the mechanism is compact and solid, and consists of but few parts.

What I claim is:—

1. In a motion transmitting mechanism, the combination of driving and driven elements, arranged substantially in axial alinement, an intermediate part mounted to have rotative movement relatively to both elements, members associated respectively with said elements and movable relatively thereto toward and from the axis of said elements, and means for resisting such movement of said members, and a connection between each of said members and said intermediate part, and arranged to effect relative movement of said members upon relative rotation of the driving and driven elements.

2. In a motion transmitting mechanism, the combination of driving and driven elements arranged substantially in axial alinement, members associated with said elements respectively and normally arranged on opposite sides of the axis of said elements, said members being movable toward and from the axis of said elements, means for resisting such movement of said members, and connecting means between the member associated with one of said elements and the member associated with the other element, and arranged to effect movement of said members upon relative rotation of the driving and driven elements, and to transmit the movement of either member to the other.

3. In a motion transmititng mechanism, the combination of driving and driven elements arranged substantially in axial alinement, said elements being formed with guides in their opposing faces, the guide of one element extending in one direction relatively to the common axis of the driving and driven elements, and the guide of the other element extending in the opposite direction, slides movable respectively in the guides and being opposed to each other, and located on opposite sides of the common axis of said elements, there being one slide in each guide, and means connecting the slides to transmit the movement of one slide along its guide to the other slide.

4. In a motion transmitting mechanism, the combination of driving and driven elements, arranged substantially in axial alinement, each of said elements being formed with a substantialy radial guide, slides movable along the guides and connecting means between the slides for transmitting the sliding movement of one to the other, said connecting means comprising a part mounted concentric with said element, and links pivoted respectively to said slides and to said part.

5. In a motion transmitting mechanism, the combination of driving and driven elements arranged substantially in axial alinement, each of said elements being formed with a substantially radial guide, slides movable along the guides connecting means between the slides for transmitting the sliding movement of one to the other, said connecting means comprising a part mounted concentric with said elements, and links pivoted respectively to said slides and to said part, the links normally extending in the same direction as the guides and being located on opposite sides of the axis of said elements.

6. In a motion transmitting mechanism, the combination of driving and driven elements, arranged substantially in axial alinement, each of said elements being formed with a substantially radial guide, slides movable along the guides, connecting means between the slides for transmitting the sliding movement of one to the other, said connecting means comprising a part mounted concentric with said elements, and links pivoted respectively to said slides and to said part, the links normally extending in the same direction as the guides and being located on opposite sides of the axis of said elements, and springs for resisting the movement of the slides in one direction.

7. In a motion transmitting mechanism, the combination of driving and driven elements, arranged in substantially axial alinement, members associated with said elements respectively and movable in radial directions, toward and from the axis of said elements, means for resisting the movement of said members, and connecting means between said members arranged to effect movement of said members upon relative rotation of the driving and driven elements, said means comprising a link pivoted at one end to one of the members, and pivotally connected at its other end to the other member.

8. In a motion transmitting mechanism, the combination of driving and driven elements, arranged in substantially axial alinement, members associated with said elements respectively and movable in radial directions, toward and from the axis of said elements, means for resisting the movement of said members, and connecting means between said members arranged to effect movement of said members upon relative rotation of the driving and driven elements, said connecting means comprising links, each of which is pivoted at one end to one of the members, and pivotally connected at its other end to the other member, the links extending in the same general direction as the direction of movement of said members and being located on opposite sides of the axis of the driving and driven elements.

9. In a motion transmitting mechanism, the combination of driving and driven elements arranged substantially in axial alinement, members associated respectively with said elements, and movable toward and from the axis of said elements, means for resisting such movement of said members, an intermediate motion transmitting part between said members and links each of which is pivoted to a member at one end and at its other end to said part.

10. In a motion transmitting mechanism, the combination of driving and driven elements, arranged substantially in axial alinement, members associated respectively with said elements and movable toward and from the axis of said elements, means for resisting such movement of said members, an intermediate motion transmitting part between said members and a link pivoted to each member at one end and at its other end to said part, the links normally extending in the same direction as the direction of movement of said members, and being located on opposite sides of the axis of said elements.

11. In a motion transmitting mechanism, the combination of driving and driven elements, one being a shaft, and the other being rotatably mounted on the shaft, said elements being formed with heads opposed to each other, members carried by the heads respectively and movable toward and from the axis of the shaft, means for resisting such movement of said members, and connecting means located between the heads and arranged to transmit the movement of either member to the other.

12. In a motion transmitting mechanism, the combination of driving and driven elements, one being a shaft, and the other being rotatably mounted on the shaft, said elements being formed with heads opposed to each other, members carried by the heads respectively and movable toward and from the axis of the shaft, means for resisting such movement, and connecting means located between the heads, and arranged to transmit the movement of either member to the other, said connecting means including an intermediate part fulcrumed on the shaft, links pivoted at their outer ends respectively, to said members, and at their inner ends to said intermediate part, the links normally extending in the same direction as the direction of movement of said member.

13. In a motion transmitting mechanism, the combination of driving and driven elements, one being a shaft, and the other being rotatably mounted on the shaft, said elements being formed with heads opposed to each other, members carried by the heads respectively and movable toward and from the shaft, means for resisting such movement, and connecting means located between the heads, and arranged to transmit the movement of either head to the other, said connecting means including an intermediate part fulcrumed on the shaft, links pivoted at their outer ends respectively to said heads, and at their inner ends to said intermediate part, the element mounted on the shaft being formed with a housing enclosing the head on the shaft and said connecting means, and having a bearing on the shaft.

14. In a motion transmitting mechanism, the combination of driving and driven elements, one being a shaft, and the other being rotatably mounted on the shaft, said elements being formed with heads opposed to each other, members carried by the heads respectively and movable toward and from the shaft, means for resisting such movement, and connecting means between said members, and arranged to transmit the movement of either member to the other, said connecting means being located between the heads and abutting against the opposing faces of the heads.

In testimony whereof, I have hereunto signed my name, at Syracuse, in the county of Onondaga, and State of New York, this 21st day of April, 1924.

GEORGE C. CARHART.